(No Model.)

J. DENVER.
BRAKE SHOE.

No. 258,285. Patented May 23, 1882.

WITNESSES:
John W. Ripley
Geo. D. Ripley

INVENTOR:
James Denver
BY S. J. Gordon
his ATTORNEY.

UNITED STATES PATENT OFFICE.

JAMES DENVER, OF NEW HAVEN, CONNECTICUT.

BRAKE-SHOE.

SPECIFICATION forming part of Letters Patent No. 258,285, dated May 23, 1882.

Application filed August 4, 1880. (No model.)

*To all whom it may concern:*

Be it known that I, JAMES DENVER, of New Haven, county of New Haven, State of Connecticut, have invented a new and useful Improvement in Brake-Shoes for Car-Wheels, which is fully set forth in the following specification and accompanying drawings, in which—

Figure 1:
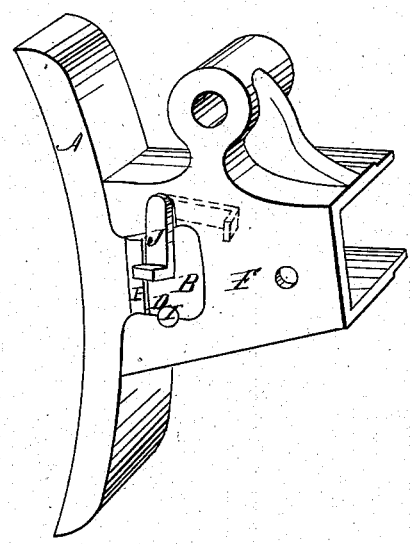
Figure 2:
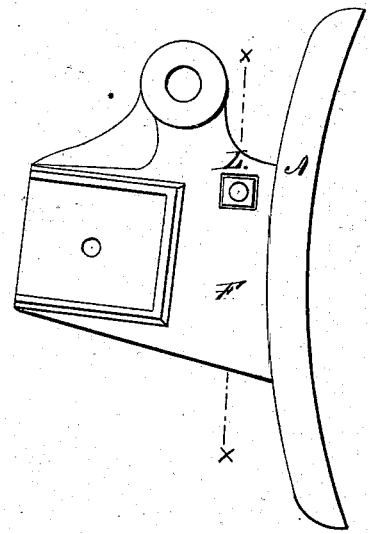
Figure 3:
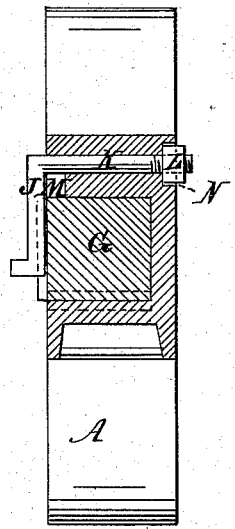

Figure 1 is a front view of my improved shoe; Fig. 2, a back view of the same; Fig. 3, a section on line $x$ $x$, Fig. 2.

The object of this invention is to facilitate the quick removal of a brake-shoe and the substitution of another, as occasion may require, without starting any nuts or changing the relations of any other parts or pieces.

A represents the shoe; B, its shank; D, a slot or recess therein to prevent its movement; E, the shoulder to prevent lever J from turning the wrong way; F, the brake-head; G, the shank-receiving box; I, the shoulder or key fitting recess D, to prevent movement of shank B; J, the pressure-lever holding shank B in place; K, its shank; L, the pressure-lever nut; M, the recess for lever J, so as to release nut L and adjust lever J without removal; N, the recess for securing nut L when lever J is adjusted.

Prior to my invention devices for removing brake-shoes were in use, by loosening the brake-bar connections, springs, &c., and taking out the bolts which fastened the shoe to the brake-head, consuming much time; also, by a bolt or bolts passing through the shank and head and kept in place by set-nuts; also, by a slot and wedge fastened by a key-bolt; and in some cases by a split key, which was opened after insertion. In all these methods it was necessary that the nut, key, or other mode of fastening should be removed before the worn shoe could be taken out and replaced after the new shoe was in position. These contrivances were all more or less complicated and troublesome in practical use, and the objectionable features thereof are obviated by my device, which requires no special tools or the removal of any part to replace the shoe.

Its operation is as follows: Brake-head F being attached to the brake-beam of a truck, pressure-lever J is turned up. Shank B is then inserted in receiving-box G, and pressure-lever J being brought down against shoulder E, shoe A is held securely in position. This movement of the pressure-lever J turns its threaded shank in the nut L and causes the lever to bind upon the shank G. Any looseness or wear can be taken up by adjusting the nut L upon the shank in the manner before described.

To remove the shoe, the lever J is turned up, as shown in dotted lines, Fig. 1 in the drawings, and the shoe and its shank are at once released.

What I claim as my invention, and desire to secure by Letters Patent, is—

The combination of shoe A, shank B, receiving-box G, and pressure-lever J, its shank K, and nut L, constructed and operating together substantially as and for the purpose described.

JAMES DENVER.

Witnesses:
   GEO. GREGORY,
   E. B. NOBLE.